United States Patent
Chou et al.

(10) Patent No.: US 9,287,566 B1
(45) Date of Patent: Mar. 15, 2016

(54) ANTI-CURL COPPER FOIL

(71) Applicant: Chang Chun Petrochemical Col., Ltd., Taipei (TW)

(72) Inventors: Jui-Chang Chou, Taipei (TW);
Kuei-Sen Cheng, Taipei (TW);
Yao-Sheng Lai, Taipei (TW);
Huei-Fang Huang, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 14/737,033

(22) Filed: Jun. 11, 2015

Related U.S. Application Data

(60) Provisional application No. 62/149,402, filed on Apr. 17, 2015.

(51) Int. Cl.
| | | |
|---|---|---|
| *H01M 4/133* | (2010.01) | |
| *H01M 4/64* | (2006.01) | |
| *H01M 4/66* | (2006.01) | |
| *H01M 4/70* | (2006.01) | |
| *H01M 4/587* | (2010.01) | |
| *C25D 1/04* | (2006.01) | |

(52) U.S. Cl.
CPC .............. *H01M 4/661* (2013.01); *C25D 1/04* (2013.01); *H01M 4/133* (2013.01); *H01M 4/587* (2013.01); *H01M 2220/20* (2013.01)

(58) Field of Classification Search
CPC ..... H01M 4/133; H01M 4/583; H01M 4/661; H01M 4/70; H01M 10/052

USPC ................ 429/231.8, 233, 245; 428/606, 607
See application file for complete search history.

(56) References Cited

U.S. PATENT DOCUMENTS

| | | | |
|---|---|---|---|
| 5,700,562 A * | 12/1997 | Sugimoto et al. | 428/327 |
| 8,349,518 B2 | 1/2013 | Kim et al. | |
| 2002/0064019 A1 | 5/2002 | Dobashi et al. | |
| 2009/0142607 A1* | 6/2009 | Narui et al. | 428/458 |
| 2009/0166213 A1 | 7/2009 | Dobashi et al. | |
| 2010/0038115 A1* | 2/2010 | Matsuda et al. | 174/254 |
| 2012/0202101 A1* | 8/2012 | Ueda | 429/127 |
| 2014/0342178 A1 | 11/2014 | Saito | |

FOREIGN PATENT DOCUMENTS

| | | |
|---|---|---|
| JP | 5352542 | 11/2013 |
| KR | 10-1117370 | 11/2010 |
| WO | WO-2013136729 | 9/2013 |

* cited by examiner

*Primary Examiner* — Sean P Cullen
(74) *Attorney, Agent, or Firm* — Novak Druce Connolly Bove + Quigg LLP

(57) ABSTRACT

The present disclosure relates to an improved coated copper foil that exhibits anti-curl and anti-wrinkle properties; and to methods for manufacturing the foil. Typically, the copper foil of the instant disclosure has: (a) a shiny side; (b) a matte side, wherein the matte side has an MD gloss in the range of 330 to 620; (c) a difference in surface roughness (Rz) between the shiny side and the matte side in the range of 0.3 to 0.59 μm; and (d) a difference in tensile strength in the transverse direction of 1.2 kgf/mm² or less.

24 Claims, 3 Drawing Sheets

ANTI-CURL COPPER FOIL

FIELD OF THE DISCLOSURE

The present disclosure relates to an improved copper foil that exhibits anti-curl and anti-wrinkle properties; and to methods for manufacturing the foil.

BACKGROUND

An electrolytic copper foil is produced by using an aqueous solution composed of sulfuric acid and copper sulfate as an electrolyte, a titanium plate coated by iridium or an oxide thereof as a dimensionally stable anode (DSA), a titanium drum as a cathode, applying a direct current between two electrodes to electrodeposit copper ions in the electrolyte on the titanium drum, and then stripping the electrolytic copper foil from the surface of the titanium drum and continuously winding for manufacturing. The side that the electrolytic copper foil contacts with the surface of the titanium drum is referred to as "shiny side (S side)," and the back side of the electrolytic copper foil is referred to as "matte side (M side)." Usually, the roughness of the S side of an electrolytic copper foil depends on the roughness of the surface of the titanium drum. Therefore, the roughness of the S side of the electrolytic copper foil is relatively consistent, whereas the roughness of the M side can be controlled by adjusting the conditions of the copper sulfate electrolyte.

The current copper sulfate electrolytes for producing electrolytic copper foils for use in lithium ion secondary batteries can be mainly classified into two major categories, and one of which is the so-called additives-containing system, i.e., to a copper sulfate electrolyte, adding organic additives such as gelatin, hydroxyethyl cellulose (HEC) or polyethylene glycol (PEG), capable of inhibiting electrodeposition of copper ions, and sulfur-containing compounds such as sodium 3-mercaptopropane sulfonate (MPS) and bis-(3-sodiumsulfopropyl disulfide (SPS), capable of refining crystalline particles. As such, the roughness of the M side of the electrolytic copper foil can be lowered, and thereby obtaining an electrolytic copper foil with double-sided gloss and having a structure containing fine crystalline particles. The other category is the so-called non-additives-containing system, i.e., no addition of any organic additives to a copper sulfate electrolyte. This type of non-additives-containing system is contrary to the additives-containing system. The lower the total content of the organics in the copper sulfate electrolyte, the higher the likelihood of obtaining a glossy electrolytic copper foil having low roughness at the M side and no abnormal protruded particles on the surface. Although no organic additives are added to the copper sulfate electrolyte obtained from the non-additives-containing system, the copper raw material used in the copper sulfate electrolyte are mainly derived from commercially available recycled copper wires. The surfaces of the copper wires contain grease or other organic substances, such that when the copper wires are dissolved in sulfuric acid, the electrolyte for producing an electrolytic copper foil would be filled with impurities like grease or organic impurities. The higher the content of the organic impurities, the higher the likelihood of generating an electrolytic copper foil having numerous abnormal protruded particles on the M side. Hence, no electrolytic copper foil having double-sided gloss is obtained.

Moreover, when the M side of an electrolytic copper foil has numerous abnormal protruded particles, the subsequent applications in the manufacture of electrolytic copper foil are usually problematic. For example, during a copper roughening treatment, the abnormal protruded particles on the M side easily induce point discharging, which cause the copper roughening particles to abnormally concentrate. Subsequently, when the copper clad laminate was formed by pressing the electrolytic copper foil, the residual copper which was formed due to incomplete etching can easily cause a short circuit. As a result, the yields of the downstream products are poor.

Due to the increasing concerns of environmental awareness, gradually single-use batteries (primary batteries) have been replaced by the high performance secondary batteries which are widely used in consumer electronic products, energy storage systems, and other industries.

Following the development of auto industry, the demands for lithium ion secondary batteries have increased. Besides the demands for favorable charging-discharging performances, the safety and battery life of lithium ion secondary batteries should also be taken into consideration. The development trend of lithium ion secondary batteries is moving toward developing power storage batteries for energy storage systems. In order to develop lithium ion secondary batteries to fulfill the system-scale requirements and satisfy the development trend of energy storage technologies, the battery capacitance of the lithium ion secondary battery has to reach the scale of MW/MWh, the cycle life of the lithium ion secondary battery used in a mobile phone should be over 2000 times and the cycle life of the lithium ion secondary battery used in an energy storage system should be over 6000 times.

A lithium ion secondary battery is produced by coiling an anode plate, a separator, and a cathode plate, placing the anode plate, separator and cathode plate into a container, adding an electrolyte and sealing the container, wherein the anode plate is consisting of a anode current collector constructed by a copper foil and an anode active material (such as a carbon-based material) which is coated on the surface of the anode current collector. The copper foil can be a rolled copper foil or an electrolytic copper foil.

SUMMARY OF THE DISCLOSURE

The present disclosure relates to a copper foil which exhibits surprising anti deformation properties (e.g., it is resistant to curling and wrinkling). Typical copper foils have a tendency to deform, especially at the edges (curl at the edges) due to changes in heat and pressure. Unwanted curling causes problems when rolling the copper foil. For instance, when the copper foil goes through a guide roll, curled edges can get caught in the machinery and cause the foil to wrinkle. Applicants have developed a copper foil (and a process for manufacturing the coated copper foil) that exhibits much less deformation (e.g., less unwanted curling and wrinkling) than typical copper foils, Applicants found that elements such as, for example, the gloss, roughness, and tensile strength, influence the deformation properties of the copper foil. In some instances, applicants found that the following three components can be used to manufacture an improved copper foil having improved anti-deformation properties: (1) the gloss of the matte side of the copper foil; (2) the difference in surface roughness (Rz) between the shiny side and the matte side of the copper foil; and (3) the difference in tensile strength in the transverse direction (TD) of the copper foil.

BRIEF DESCRIPTION OF THE DRAWINGS

Implementations of the present technology will now be described, by way of example only, with reference to the attached figures, wherein.

Figure 1:
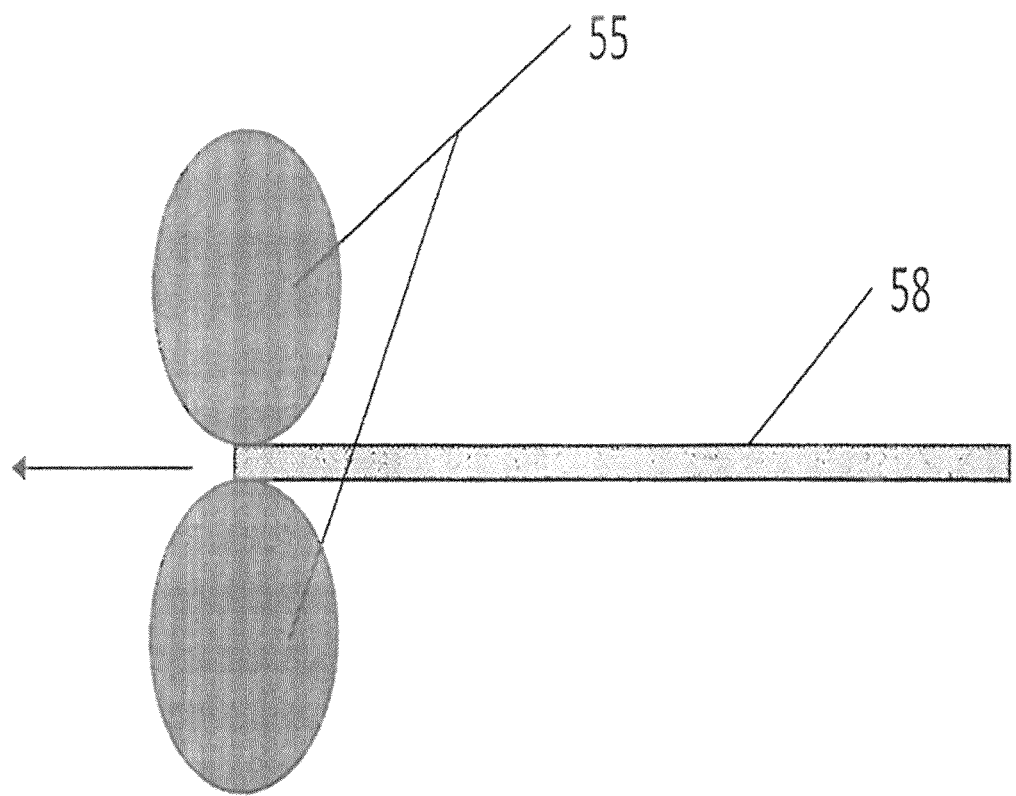
FIG. 1 is a diagram showing copper foil being pressed between two rollers.

It should be understood that the various aspects are not limited to the arrangements and instrumentality shown in the drawings.

DETAILED DESCRIPTION OF THE DISCLOSURE

Typically, the copper foil of the instant disclosure, has: (a) a shiny side; (b) a matte side, wherein the matte side has an machine direction (MD) gloss in the range of 330 to 620; (c) a difference in surface roughness (Rz) between the shiny side and the matter side in the range of 0.3 to 0.59 µm; and (d) a difference in tensile strength in the transverse direction of 1.2 kgf/mm$^2$ or less. The matte side can also have a gloss in the range of 400 to 600, or in the range of 450 to 500. The thickness of the copper foil can be, for example, from 1 to 50 µm, from 4 to 35 µm, from 4 to 25 µm, or from 6 to 20 µm.

The copper foil of the instant disclosure is unique in that it does not curl like traditional copper foils. For instance, in some cases, the degree of curl after being subjected to pressing and heat treatment is less than 5 mm. The degree of curl (after being subjected to pressing and heat treatment) may be 2 mm or less, or 1 mm or less. The degree of curl is calculated by cutting two 10 cm long slits in the copper foil in the shape of a cross (or the shape on an "X") at ambient temperature and then measuring the amount of curl or deformation at the corners of the foil (created by the "X" cut). The measurements are taken immediately after cutting the foil.

The copper foil of the instant disclosure can have a difference in surface roughness (Rz) between the shiny side and the matte side in the range of 0.3 to 0.59 µm, the roughness (Rz) of the matte side is in the range from 0.5 to 0.8 µm. Additionally, the copper foil may have a difference in tensile strength in the transverse direction of 0.9 kgf/mm$^2$, 0.7 kgf/mm$^2$, 0.5 kgf/mm$^2$, or 0.4 kgf/mm$^2$ or less.

The instant disclosure also relates to a copper foil comprising a carbonaceous layer on one or both sides of the foil. If the carbonaceous layer is on one side, it can be on the M-side or the S-side. The copper foil, including the copper foil having a carbonaceous layer on one or both sides may be included in a secondary battery, such as a lithium ion battery. Accordingly, the instant disclosure relates to a secondary battery comprising the copper foils described herein. The secondary battery, such as a lithium ion secondary battery is obtained by reeling a positive electrode pole piece, a separator, and a negative electrode pole piece together, placing them into a container, injecting an electrolyte, and sealing to form a battery, wherein the negative electrode pole piece is composed of a negative electrode collector made of copper foil and a negative electrode active substance made of a carbon material and the like coating on a surface thereof.

The instant disclosure also relates to a process for making the copper foil described herein. Such a process may comprise adding a copper sulfate electrolyte; performing an electrochemical reaction on the copper sulfate electrolyte solution, so as to obtain the electrolytic copper foil having: (a) a shiny side; (b) a matte side, wherein the matte side has an MD gloss in the range of 330 to 620; (c) a difference in surface roughness (Rz) between the shiny side and the matte side in the range of 0.3 to 0.59 µm; and (d) a difference in tensile strength in the transverse direction of 1.2 kgf/mm$^2$ or less. Further, the process can include winding the cupper foil.

The instant disclosure further relates to a copper foil having a resistance to curling comprising (a) a shiny side having a roughness (Rz) in the range of 1.0 to 1.5 µm; (b) a matte side, wherein the matte side has an MD gloss in the range of 330 to 620; (c) a difference in surface roughness (Rz) between the shiny side and the matte side in the range of 0.3 to 0.59 µm; and (d) a difference m tensile strength in the transverse direction of 1.2 kgf/mm$^2$ or less. In some cases, the copper foil has a shiny side roughness (Rz) in the range of 1.08 to 1.12 µm. Furthermore, the copper foil may have an elongation of 4-8% when the thickness is 6 µm, 5-10% when the thickness is 8 µm, 7-12% when the thickness is 10 µm, and 14-18% when the thickness is 20 µm. Moreover, the copper foil can had a transverse direction gloss in the range of 300 to 650 or in the range of 329 to 610.

In some instances, the copper foil has (a) a shiny side having a roughness (Rz) in the range of 1.08 to 1.12 µm; (b) a matte side, wherein the matte side has an MI) gloss in the range of 330 to 620; (c) a difference in surface roughness (Rz) between the shiny side and the matte side in the range of 0.3 to 0.59 µm; and (d) a difference in tensile strength in the transverse direction of 1.2 kgf/mm$^2$ or less, wherein the thickness of the copper foil is from 6 to 20 µm.

The copper foils of the instant disclosure are useful in batteries, electronic devices comprising the batteries, and/or in the electronic devices themselves (not in the battery). For example, the copper foil may be used in electronic devices such as power tools, automobiles, electric vehicles including electric automobiles, cell phones, tablets, other portable electronic devices, etc.

Finally, the instant disclosure relates to methods for reducing rejection of products caused by curling or wrinkling of the copper foil comprising forming a copper foil as described herein, providing a carbonaceous layer on the copper foil, optionally pressing the coated foil, and rolling the copper foil.

Gloss is determined by projecting a beam of light at a fixed intensity and angle onto a surface and measuring the amount of reflected light at an equal but opposite angle. A glossmeter (also gloss meter) is an instrument which is used to measure specular reflection gloss of a surface. The glossmeter directs a light at a specific angle to the test surface and simultaneously measures the amount of reflection.

Roughness is a component of surface texture. It is quantified by the deviations in the direction of the normal vector of a real surface from its ideal form. If these deviations are large, the surface is rough; if they are small, the surface is smooth. Roughness is often reported with Ra or Rz values. The Ra is defined as the arithmetic average value of all absolute distances of the roughness profile from the center line within the measuring length. The Rz is defined as the average value of maximum peak to valley height of five consecutive sampling lengths within the measurement length. This value is approximately equivalent to the values of profile determined from microsectioning techniques. The measurement that is regarded as the most appropriate in regard to high-frequency electrical performance is the Rq value. This is also considered the root mean square (RMS) of the peak-to-valley measurement within the scan region. Historically, the copper-surface roughness has been measured with a physical stylus procedure. This is a well-known test method, but it may report a smoother profile, due to the limitation of the stylus tip in reaching the depth of a valley. There are also laser profilometer measurement methods that are generally regarded as more accurate; however, there are several different technologies and techniques to consider. In a preferred embodiment, the difference in surface roughness (Rz) between the shiny side and the matte side is in the range of 0.3 to 0.51.

Tensile strength is the maximum stress that a material can withstand while being stretched or pulled before failing or breaking. Tensile strength is not the same as compressive strength and the values can be quite different. Elongation, tensile strength, and roughness are measured using IPC-TM-650.

Conventionally, an organic additive (for example, a low-molecular-weight gel (such as gelatin), hydroxyethyl cellulose (HEC) or polyethylene glycol (PEG)) or a sulfur-containing compound having a grain-refining effect (for example, sodium 3-mercaptopropane sulfonate (MPS), bis-(3-soldiumsulfopropyl disulfide) (SPS)) is added to a copper sulfate electrolyte to alter the crystalline phase of the electrodeposited copper foil.

Example 1

Manufacture of Electrolytic Copper Foil

Copper wires were dissolved in a 50 wt % sulfuric acid aqueous solution to prepare a copper sulfate electrolyte containing 320 g/l of copper sulfate ($CuSO_4 \cdot 5H_2O$) and 100 g/l of sulfuric acid. To per liter of the copper sulfate electrolyte, 5.31 mg of gelatin (2CP: Koei Chemical Co., Ltd.), 2.89 mg of sodium 3-mercapto-1-propanesulfonate (MPS: HOPAX Company), 0.21 mg of thiourea (Chem-Lab) and 25 mg chloride ion were added. Subsequently, an electrolytic copper foil with thickness of 6 μm was prepared at the liquid temperature of 45° C. and the current density of 34 A/dm². See Inventive Foil #1 (uncoated) in Table 1 below. The roughness, tensile strength, elongation, gloss and curl of the uncoated electrolytic copper foil was measured as described in Example 4.

Example 2

Coating the Electrolytic Copper Foil

An anode slurry was prepared by using water as a solvent and the anode materials listed in the table below with a solid-liquid ratio of 73% (100 g of anode materials; 73 g of water).

TABLE 1

| Anode Material | % Based on Total Weight of Anode Materials |
|---|---|
| Anode Active Material (Mesophase Graphite Powder Anode; MGPA) | 95 wt % |
| Conductive additive (Conductive Carbon Black; Super P ®) | 1 wt % |
| Thickening Agent (Carboxymethyl Cellulose; CMC) | 1.6 wt % |
| Water-Based Binder (Styrene-Butadiene Rubber; SBR) | 2.4 wt % |

After the components of the anode material formulation were mixed, the carbon material slurry was coated on the surface of copper foil at a speed of 5 meters per minute to a thickness of 200 μm and then dried through a 120° C. oven. See inventive Foil #1 (coated) in Table 2 below. The roughness, tensile strength, elongation, gloss and curl of the coated electrolytic copper foil was measured as described in Example 4.

Example 3

Pressing the Electrolytic Copper Foil

Both the uncoated electrolytic copper foil of Example 1 (uncoated Inventive Foil #1 in Table 2) and the coated electrolytic copper foil of Example 2 (coated Inventive Foil #1 in Table 2) were pressed. The dimension of the rollers of the pressing machine were 250 mm×250 mm, hardness of the rollers was 62~651° HRC, and the roller material was high-carbon chrome bearing steel (SUJ2). The copper foil of Example 1 (uncoated Inventive Foil #1 in Table 2) was pressed by 1 M/min pressing speed and 5000 kg pressure until the thickness was reduced by at least 0.3%. The copper foil of Example 2 (coated Inventive Foil #1 in Table 2) was pressed by 1 M/min pressing speed and 5000 kg pressure until the carbonaceous layer reached a density of 1.5 g/cm³. FIG. 1 is a schematic showing copper foil 58 being feed into two rollers 55 to be pressed.

Example 4

Measurements

Figure 2:
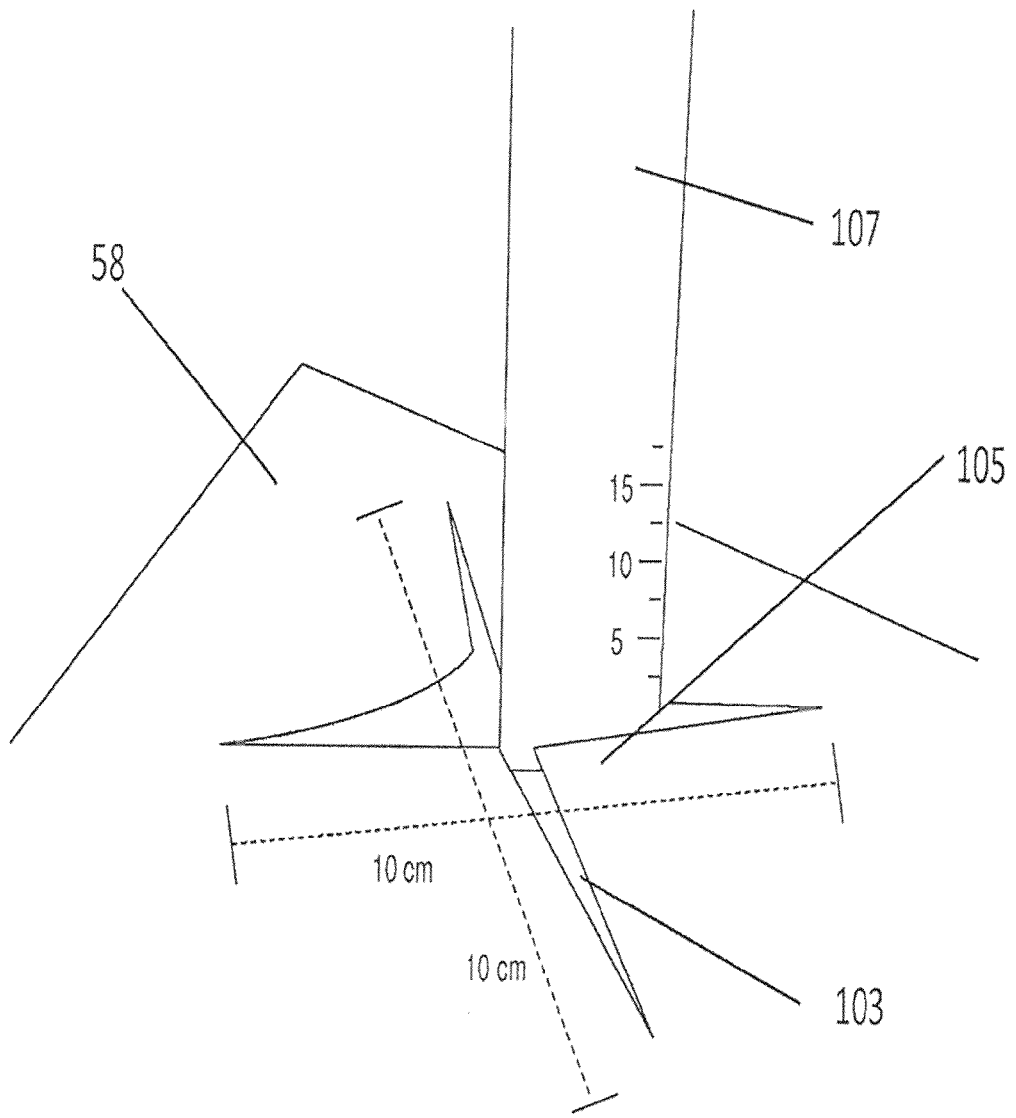
FIG. 2 is a schematic showing how the amount of curl of a copper foil is measured.

Curl:

A section of the pressed copper foil of Example 1 and Example 2 was placed against a solid plastic board with the M-side of the copper foil facing upward, A sheet of paper having a 10 cm×10 cm cross drawn upon it was placed on top of the M-side of the copper foil. A sharp box knife was used to slice the through the paper and the underlying copper foil along the lines of the 10 cm×10 cm cross drawn upon the paper. A ruler was used to help stabilize the knife during the cutting process and ensure that the slice was straight. The paper was then lifted from the copper foil and the corners of the copper foil resulting from the slicing were allowed to freely curl upward. The ruler was used to measure the maximum height of the curl. FIG. 2 is a schematic showing a ruler 107 placed into the opening created by a cross-shaped slit 103 in copper foil 58. The ruler 107 is used to measure the maximum height of the curl at corners 105. If the amount of curl is about 1 to 2 mm (or less), the copper foil is significantly resistant to curling; this represents an excellent result. If the amount of curl is between above 2 and less than 3 mm, the copper foil remains largely resistant to extreme curling; this represents a good result. An amount of curl between about 3 and 5 mm is considered a medium result. An amount of curl greater than 5 mm is considered poor.

Tensile Strength:

Tensile strength was measured according to IPC-TM-650. The electrolytic copper foil was cut to obtain a test sample in the size of 100 mm×12.7 mm (length×width). The test sample was measured at room temperature (about 25° C.) under the conditions of a chuck distance of 50 mm and a crosshead speed of 50 mm/min by using Model AG-I testing machine of Shimadzu Corporation.

Figure 3:
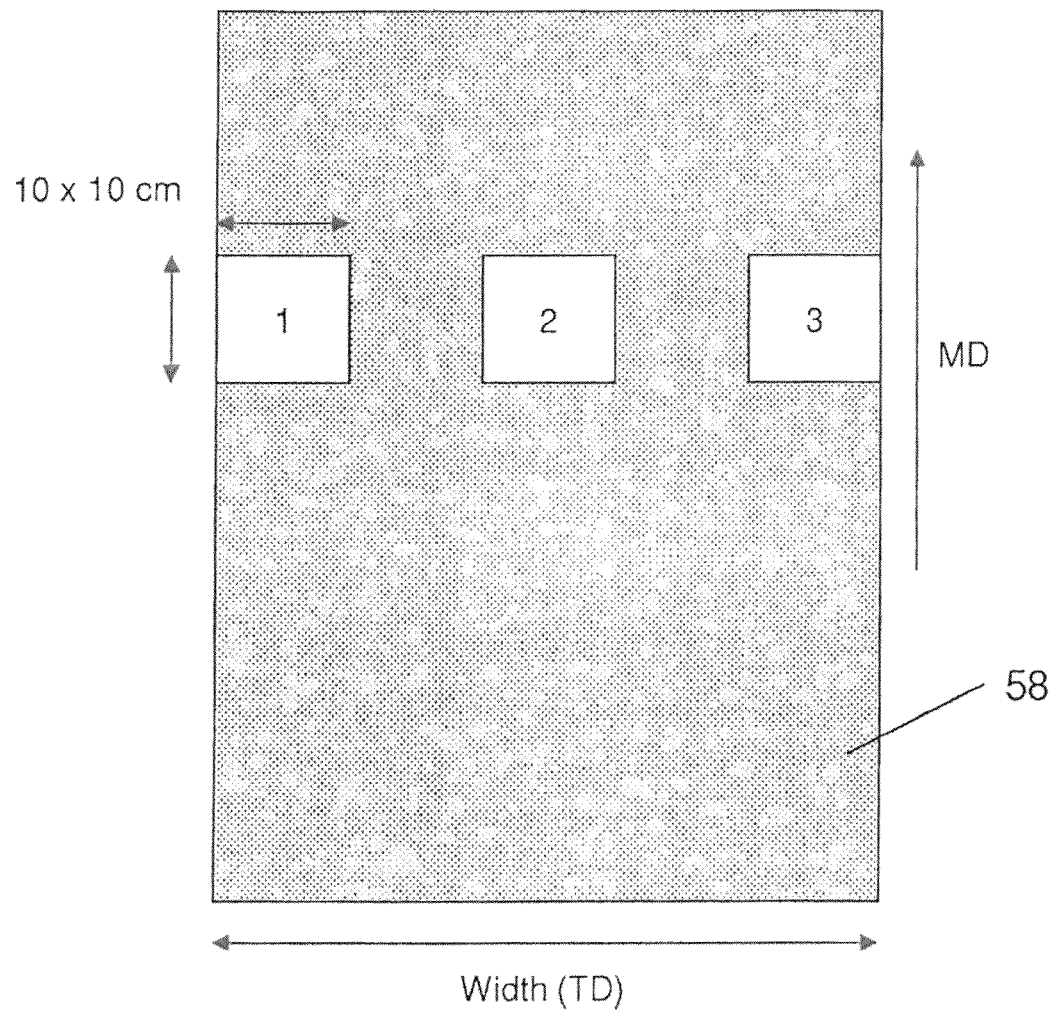
FIG. 3 is schematic showing how measurements of ΔT/S in the transverse direction of the copper foil are calculated.

Measurement of ΔT/S in Transverse Direction:

Three samples having the dimension of 10 cm×10 cm were cut from the copper foil in the transverse direction. Two samples were taken from each of the two edges, and a third sample was taken from the center. The ΔT/S was calculated by subtracting the minimum T/S from the Maximum T/S. FIG. 3 shows three square samples 1, 2, and 3, each being 10 cm×10 cm in size, cut from copper foil 58 in the transverse direction.

Elongation:

Elongation was measured according to IPC-TM-650. The copper foil was cut to obtain a test sample in the size of 100 mm×12.7 mm (length×width). The test sample was measured at room temperature (about 25° C.) under the conditions of a chuck distance of 50 mm and a crosshead speed of 50 mm/min by using Model AG-I testing machine of Shimadzu Corporation.

Gloss:

Gloss was measured using a gloss meter (manufactured by BYK Company; Model No. micro-gloss 60° type) according to JIS Z8741, i.e., by measuring the gloss at the M side in the machine direction (MD) and transverse direction (TD) at a light incident angle of 60°.

Inventive Foils #2-14 in Table 2 below and Comparative Foils #1-11 in Table 3 below were prepared and their properties measured using the procedures described in the examples above.

TABLE 2

| Inventive Foil No. | Thickness (μm) | MD Gloss | TD Gloss | S side Roughness (μm) | M side Roughness (μm) | Δ Roughness of Both Sides (μm) | Δ T/S of TD (kgf/mm²) | Elongation (%) | Curl of Copper Foil after Pressing (mm) | Curl of Coated Copper Foil after Pressing (mm) |
|---|---|---|---|---|---|---|---|---|---|---|
| 1 | 6 | 335 | 329 | 1.09 | 0.79 | 0.30 | 0.9 | 7.4 | 1 | 0 |
| 2 | 6 | 358 | 342 | 1.1 | 0.78 | 0.32 | 0.7 | 6.5 | 1 | 0 |
| 3 | 6 | 384 | 378 | 1.08 | 0.76 | 0.32 | 0.4 | 6.8 | 2 | 0 |
| 4 | 6 | 429 | 418 | 1.09 | 0.73 | 0.36 | 0.3 | 5.7 | 3 | 1 |
| 5 | 6 | 452 | 443 | 1.09 | 0.71 | 0.38 | 0.5 | 4.4 | 4 | 2 |
| 6 | 8 | 541 | 523 | 1.11 | 0.67 | 0.44 | 0 | 9.2 | 1 | 0 |
| 7 | 8 | 557 | 552 | 1.08 | 0.67 | 0.41 | 0.2 | 8.5 | 3 | 1 |
| 8 | 8 | 560 | 551 | 1.08 | 0.66 | 0.42 | 0 | 7.8 | 2 | 1 |
| 9 | 8 | 563 | 558 | 1.09 | 0.62 | 0.47 | 0.1 | 6.5 | 5 | 3 |
| 10 | 8 | 565 | 557 | 1.13 | 0.59 | 0.54 | 0.1 | 5.6 | 2 | 0 |
| 11 | 20 | 581 | 573 | 1.12 | 0.63 | 0.49 | 0.2 | 17.8 | 1 | 0 |
| 12 | 20 | 586 | 574 | 1.12 | 0.62 | 0.5 | 0.4 | 16.2 | 3 | 1 |
| 13 | 20 | 598 | 583 | 1.11 | 0.60 | 0.51 | 0.6 | 16.4 | 3 | 1 |
| 14 | 20 | 619 | 610 | 1.1 | 0.51 | 0.59 | 1.2 | 14.6 | 1 | 0 |

TABLE 3

| Comparative Foil No. | Thickness (μm) | MD Gloss | TD Gloss | S-Side Roughness (μm) | M-Side Roughness (μm) | Δ Roughness of Both Sides (μm) | Δ T/S of TD (kgf/mm²) | Elongation (%) | Curl of Copper Foil after Pressing (mm) | Curl of Coated Copper Foil after Pressing (mm) |
|---|---|---|---|---|---|---|---|---|---|---|
| 1 | 6 | 179 | 163 | 1.08 | 1.24 | 0.16 | 1.5 | 7.5 | 12 | 8 |
| 2 | 6 | 198 | 173 | 1.12 | 1.18 | 0.06 | 1.5 | 7.8 | 13 | 9 |
| 3 | 6 | 225 | 213 | 1.11 | 1.09 | 0.02 | 1.4 | 7.1 | 13 | 10 |
| 4 | 6 | 252 | 243 | 1.11 | 1.11 | 0 | 1.4 | 6.8 | 11 | 9 |
| 5 | 8 | 273 | 261 | 1.09 | 1.10 | 0.01 | 1.4 | 9.4 | 8 | 6 |
| 6 | 8 | 289 | 273 | 1.08 | 0.99 | 0.09 | 1.4 | 8.6 | 10 | 9 |
| 7 | 8 | 318 | 310 | 1.12 | 0.87 | 0.25 | 1.3 | 8.7 | 9 | 7 |
| 8 | 20 | 632 | 624 | 1.12 | 0.51 | 0.61 | 1.4 | 15.5 | 6 | 4 |
| 9 | 20 | 643 | 635 | 1.13 | 0.48 | 0.65 | 1.5 | 14.3 | 8 | 6 |
| 10 | 20 | 651 | 643 | 1.11 | 0.47 | 0.64 | 1.3 | 14.6 | 7 | 4 |
| 11 | 20 | 641 | 632 | 1.09 | 0.48 | 0.61 | 1.5 | 14.2 | 6 | 6 |

The data in the tables above show that copper foil having the following parameters exhibits an unexpected resistance to curling:

(1) The matte side has an MD gloss in the range of 330 to 620;

(2) The difference in surface roughness (Rz) between the shiny side and the matte side in the range of 0.3 to 0.59 μm; and (3) The difference in tensile strength in the transverse direction of 1.2 kgf/mm² or less.

The above embodiments are only used to illustrate the principle of the present disclosure and the effect thereof, and should not be construed as to limit the present disclosure. The above embodiments can be modified and altered by those skilled in the art, without departing from the spirit and scope of the present disclosure. Therefore, the protection scope of the present disclosure is defined in the following appended claims. As long as it does not affect the effects and achievable goals of this disclosure, it should be covered under the technical contents disclosed herein.

The invention claimed is:

1. A copper foil having a resistance to curling comprising:
   a copper foil having dimensions in a machine direction MD, dimensions in a transverse direction TD, and a thickness, the copper foil further comprising:
   a. a shiny side;
   b. a matte side, wherein the matte side has a machine direction MD gloss, measured at an incidence angle of 60°, is in the range of 330 to 620;
   c. a difference in surface roughness Rz between the shiny side and the matte side in the range of 0.3 to 0.59 μm; and
   d. a difference in tensile strength taken from at least two samples across the foil in the transverse direction TD of 1.2 kgf/mm² or less.

2. The copper foil of claim 1, wherein the machine direction MD gloss, measured at an incidence angle of 60°, of the matte side is in the range of 400 to 600.

3. The copper foil of claim 1, wherein the machine direction MD gloss, measured at an incidence angle of 60°, of the matte side is in the range of 450 to 550.

4. The copper foil of claim 1, wherein the thickness of the foil is from 1 to 50 µm.

5. The copper foil of claim 1, wherein the thickness of the foil is from 4 to 25 µm.

6. The copper foil of claim 1, wherein the thickness of the foil is from 6 to 20 µm.

7. The copper foil of claim 1, wherein the difference in surface roughness Rz between the shiny side and the matte side is in the range of 0.3 to 0.51 µm.

8. The copper foil of claim 1, wherein the surface roughness Rz of the matte side in the range of 0.5 to 0.8 µm.

9. The copper foil of claim 1, wherein the surface roughness Rz of the shiny side is in the range of 1.08 to 1.12 µm.

10. The copper foil of claim 1, wherein the difference in tensile strength taken from at least two samples across the foil in the transverse direction TD of 0.9 kgf/mm$^2$ or less.

11. The copper foil of claim 1, having an elongation of 4-8% when the thickness is 6 µm, an elongation of 5-10% when the thickness is 8 µm, an elongation of 7-12% when the thickness is 10 µm, and an elongation of 14-18% when the thickness is 20 urn wherein a transverse direction TD gloss, measured at an incidence angle of 60°, is in the range of 300 to 650.

12. The copper foil of claim 1, wherein the resistance to curl of the copper foil, after being subjected to pressing, is less than 5 mm.

13. The copper foil of claim 1, wherein the resistance to curl of the copper foil, after being subjected to pressing and heat, is more than 3 but less than 5 mm.

14. The copper foil of claim 1, wherein the resistance to curl of the copper foil, after being subjected to pressing, is less than 3 mm.

15. The copper foil of claim 1, wherein the resistance to curl of the copper foil, after being subjected to pressing, is less than 2 mm.

16. The copper foil of claim 1, wherein the resistance to curl of the copper foil, after being subjected to pressing, is less than 1 mm.

17. The copper foil of claim 1, further comprising a carbonaceous layer on at least one of the shiny side or the matte side of the foil.

18. The copper foil of claim 17, wherein the resistance to curl of the copper foil, after being subjected to pressing and heat, is less than 5 mm.

19. The copper foil of claim 17, wherein the resistance to curl of the cooper foil, after being subjected to pressing and heat, is less than 3 mm.

20. The copper foil of claim 17, wherein the resistance to curl of the copper foil, after being subjected to pressing and heat, is less than 2 mm.

21. The copper foil of claim 17, wherein the resistance to curl of the copper foil, after being subjected to pressing and heat, is less than 1 mm.

22. The copper foil of claim 1, further comprising a carbonaceous layer on both the shiny and matte sides of the foil.

23. A secondary battery comprising a foil according to claim 1, an electrolyte, a separator, and a carbonaceous material.

24. An electronic device comprising the secondary battery of claim 23, the electronic device being selected from the group consisting of a power tool, an electric vehicle, a cell phone, a tablet, and a portable electronic device.

* * * * *